Aug. 28, 1923.

J. B. YOUNG

AUTOMOBILE SIGNAL DEVICE

Filed Oct. 1, 1920

1,466,220

INVENTOR
Jackson B. Young
BY
Booth & Booth
ATTORNEYS

Patented Aug. 28, 1923.

1,466,220

UNITED STATES PATENT OFFICE.

JACKSON B. YOUNG, OF OAKLAND, CALIFORNIA.

AUTOMOBILE SIGNAL DEVICE.

Application filed October 1, 1920. Serial No. 414,041.

*To all whom it may concern:*

Be it known that I, JACKSON B. YOUNG, a citizen of the United States, residing at Oakland, in the county of Alameda and State of California, have invented certain new and useful Improvements in Automobile Signal Devices, of which the following is a specification.

My invention relates to the class of automobile signals, especially adapted for use in designating intended changes in direction of travel, and in giving warning at street crossings.

The object of my invention is to provide a simple and effective device for this purpose, which, by a single movement of the driver is adapted to give both a visible and an audible warning.

To this end my invention consists in the novel signal device or system which I shall now describe by reference to the accompanying drawings, in which—

1 indicates an automobile; 2 the steering wheel; 3 the seat; 4 the fenders; 5 the headlights, and 6 the housing of the rear axle assembly.

Figure 1:
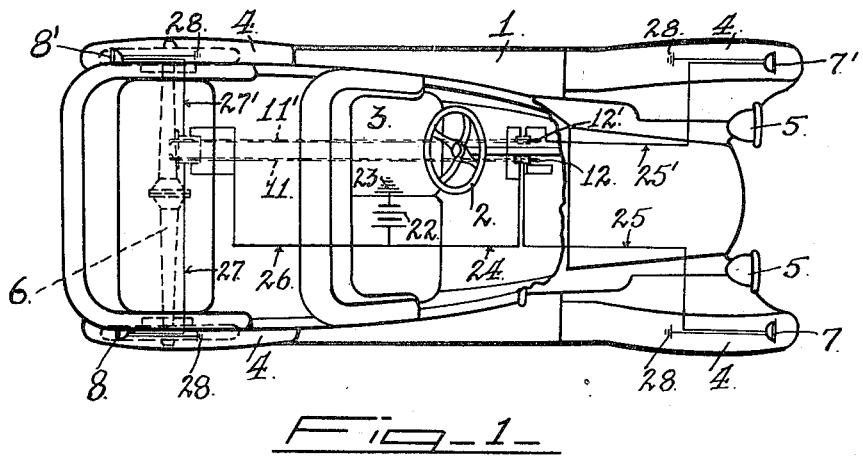
Fig. 1 is a top plan of an automobile showing diagrammatically the assemblage of my signal system.

7. in Fig. 1, is the right front signal lamp; 7' the left front signal lamp; 8 the right rear signal lamp; and 8' the left rear signal lamp. These may be located in any suitable position, but, preferably, following common practice, on the fenders.

Figure 2:
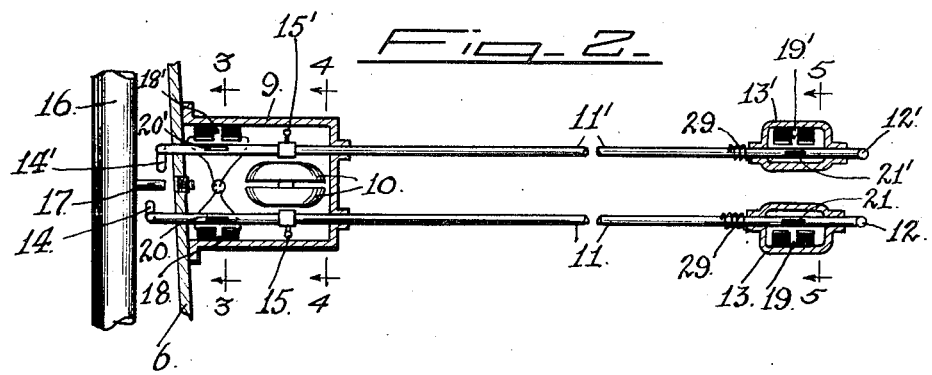
Fig. 2 is a top view, enlarged, broken, and partly in horizontal section of the essential features of my signal.
Figures 3, 4, 5:
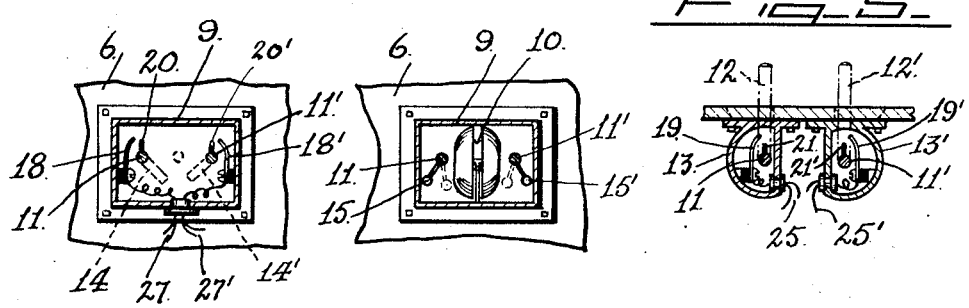
Fig. 3 is a section on the line 3—3 of Fig. 2.
Fig. 4 is a section on the line 4—4 of Fig. 2.
Fig. 5 is a section on the line 5—5 of Fig. 2.

In a casing 9, Figs. 2 and 4, secured to the rear axle housing 6, is located a gong 10, which in its best form is a double gong, the sections of which have distinct and preferably widely variant tones.

11 and 11' are two rods, right and left respectively. These are parallel and are suitably carried under the automobile floor. Their forward ends are formed with cranks 12 and 12' respectively, which project upwardly through the floor within reach of the driver's feet, as shown in Fig. 1. The front portions of these rods pass through casings 13 and 13' (Figs. 2 and 5) and their rear portions pass through the casing 9, Figs. 2, 3 and 4, and into the axle housing 6, Fig. 2, their extremities, within said housing being formed with arms 14 and 14' respectively. The rods 11 and 11' are so mounted in the casings 13, 13' and 9, that they may oscillate on their axes, and, in their best form, they are of such diameter, relatively to their length, that they may be subject at their rear portions to a torsional jar without materially affecting their forward portions.

These rods, within the casing 9, carry the gong-strikers 15 and 15' respectively.

In Fig. 2, 16 indicates the rear axle of the automobile. To this axle is fitted a pin or stud 17, in such position that it will strike the rear end arms 14 and 14' of the rods, when said rods are turned on their axis to carry said arms into the path of rotation of said pin or stud.

Within the casing 9 on its right side (Fig. 2) are the insulated brushes 18, and on the left side are the insulated brushes 18'. Within the casing 13 and 13', respectively, are the insulated brushes 19 and 19'.

On the rod 11, within casing 9 is the insulated finger 20 adapted to make electrical contact with the brushes 18, and on the rod 11' is the insulated finger 20', adapted for electrical contact with the brushes 18'.

On the rod 11 within the casing 13 is the insulated finger 21 adapted for electrical contact with the brushes 19 and on the rod 11' within the casing 13' is the insulated finger 21' to make electrical contact with the brushes 19'.

In Fig. 1, 22 is the battery and 23 the ground. 24 is the wire leading from the battery to the brushes 19 and 19' of the casings 13 and 13'. 25 is the wire leading from the brushes 19 to the right front signal lamp 7 and 25' is the wire leading from the brushes 19' to the left front signal lamp 7'.

26 is the wire from the battery to the brushes 19 and 19' in the casing 9. 27 is the wire from the brushes 18 to the right rear signal lamp 8, and 27' is the wire from the brushes 18' to the left rear signal lamp 8'.

28 indicates the several grounds of the four lamps, Fig. 1. 29 in Fig. 2, are springs to return the rods to normal position.

The operation of my signal system is as follows:—

Assume that it is the intention of the driver to turn to the right. He places his foot on the crank 12 of the right hand rod 11 and by pressure thereon turns said rod on its axis, and holds it so turned. This axial movement of said rod has the following effects. It throws the finger 21 into contact with the brushes 19 in the casing 13 and closes the circuit to the right front lamp 7, thereby lighting it. It also throws the finger 20 into contact with the brushes 18 in the casing 9 and thereby lights up the right rear lamp 8. It also carries the rear end arm 14 into the path of rotation of the pin or stud 17 on the rear axle 16, and the effect of the resultant rapid blows of said stud on said arm is to jar said rod, so that its rear portion, twisting torsionally on its axis (the front end of the rod being held by the driver's foot) causes the striker 15 carried by said rod to deliver a sounding blow on its gong member 10. Finally the same intermittent torsional twisting of the rear end of the rod has the effect of intermittently breaking the electrical contact of the finger 20 with the brushes 18, so that the right rear lamp 8 repeatedly flashes, while the right front lamp 7 remains constant. Thus both a visible and an audible signal are given, and, moreover, each signal has a special pecularity and advantage, the rear visible signal being intermittent and the audible signal, due to the two-tone gong being distinctive and its difference in tone being itself an indication of direction. All this conduces to attracting and riveting the attention of those behind upon the signal being given.

When the driver releases the pressure of his foot, the rod is returned by the spring 29 to its normal position. In like manner the signal indicating a turn to the left is given by operating the rod 11'. The operation of both rods may indicate the intention to stop. Also the warning may be effectively given at street intersections, indicating approach, right of way, and any other matters which should be forewarned. In case only an audible signal be desired, the visible signals may be omitted, or may be cut out, and then the two-tone bell alone may indicate direction.

I claim:—

An automobile signal device comprising a front lamp; a rear lamp; electric circuits to operate said lamps; a rod mounted for oscillation on its axis with its forward end under the control of the driver and its rear end provided with an arm; a stud on the rear axle of the machine into the rotary path of which the arm is moved by the turning of the rod on its axis whereby the rear portion of said rod is axially jarred; a gong; a striker carried by the rear portion of the rod, adapted, under the jarring of the rod to hit the gong; a front switch operated by the actuation of the rod to control the electric circuit to the front lamp; and a second switch at the rear, operated by the actuation of said rod, to close the electric circuit to the rear lamp, said last named switch being intermittently opened by the jarring of the rod.

In testimony whereof I have signed my name to this specification.

JACKSON B. YOUNG.